Sept. 12, 1933.        P. G. HANDOLL        1,926,200
APPARATUS FOR CLEANING THE TUBES OF WATER TUBE BOILERS
Original Filed May 6, 1924
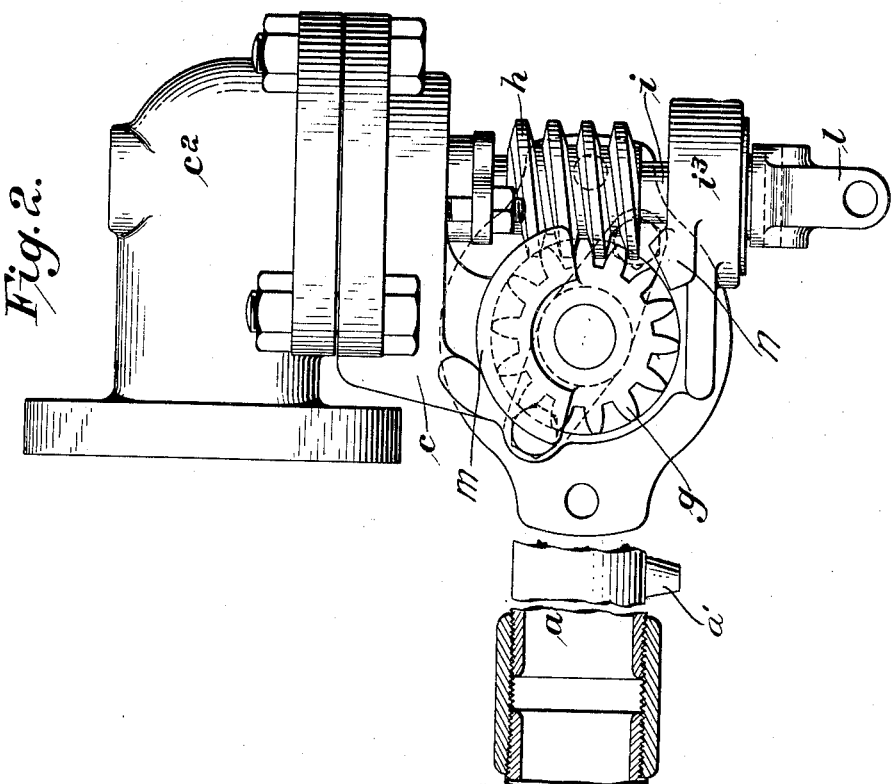
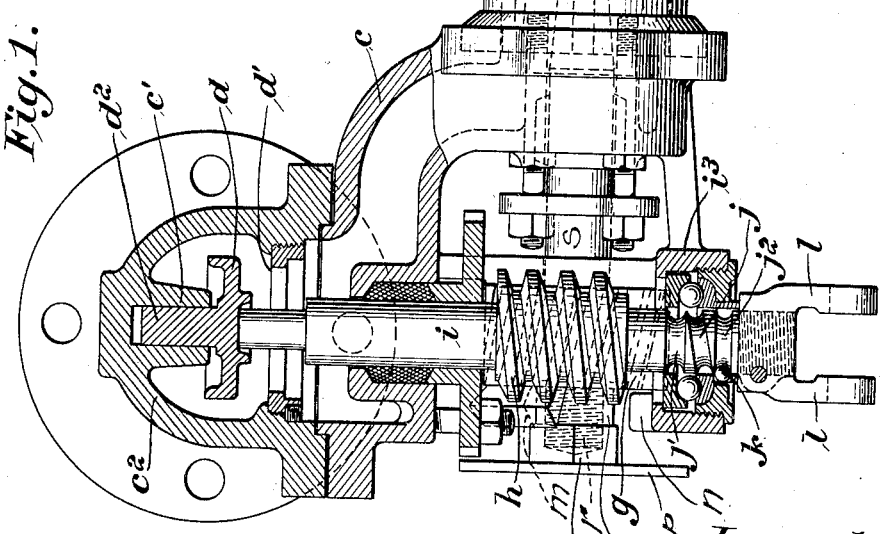
Inventor:
Percy Gilbert Handoll,
by Whittemore, Hulbert, Whittemore & Belknap
Attys.

Patented Sept. 12, 1933

1,926,200

UNITED STATES PATENT OFFICE 1,926,200

APPARATUS FOR CLEANING THE TUBES OF WATER TUBE BOILERS

Percy Gilbert Handoll, London, England, assignor to Diamond Power Specialty Corporation, Detroit, Mich., a corporation of Michigan Application May 6, 1924, Serial No. 711,453, and in Great Britain May 16, 1923. Renewed November 18, 1930

15 Claims. (Cl. 122—392)

This invention is an improvement in or modification of the invention described in my prior application Number 595,323, filed Oct. 18, 1922, wherein a blower tube with steam orifices or nipples is rotated through worm gearing comprising a worm wheel fixed on or atttached to the end of the blower tube and a worm spindle or shaft provided with an operating handle and operatively connected with a steam valve, the worm spindle or shaft being capable of both a rotary movement and an axial movement which latter movement is utilized to bring about the opening of the valve to admit steam to the blower tube at the beginning of the blowing operation, and the closing of the valve at the end of the operation.

In the construction described in the prior specification the worm spindle was arranged to effect positively the closing of the steam valve against the steam pressure whilst the opening of said valve was brought about partly by the effect of the steam pressure itself.

According to the present invention the steam valve is arranged to be opened against steam pressure by a positive thrust from the worm spindle and to close under the action of the steam pressure, when the thrust of the worm spindle is withdrawn. In this construction axial thrust may be positively imparted to the worm spindle by the engagement of a helical groove in the worm spindle with a fixed projection during the turning of the spindle. This helical groove terminates at both ends in a plain circular groove allowing the spindle to be rotated without axial movement.

In the accompanying drawing,

Fig. 1 is a sectional elevation of the operating and control mechanism of a steam blower constructed according to this invention, and Fig. 2 is an elevation at right angles to Fig. 1.

As in the prior specification $a$ indicates part of the blower tube which is adapted to be rotated by the worm gearing $g$, $h$. The greater portion of the tube $a$ is omitted from the drawing for convenience, but as illustrated this tube has a discharge nozzle $a'$. $c$ indicates the steam casing in one branch of which is located the steam valve $d$ and seat $d'$.

As shown, the steam valve $d$ is separate from the worm spindle $i$ and is supported by a stem $d^2$ operating in a guide socket $c'$ in the elbow $c^2$ of the steam branch. The valve $d$ closes on to its seat automatically under the action of the steam pressure and is opened by the inner end of the worm spindle $i$ thrusting the valve $d$ off its seat.

In order that the worm spindle $i$ may be suitably guiding in its movements to bring about the desired operation of the valve $d$, the outer portion of said spindle $i$ which is supported in a bearing bracket $i^3$ is formed with a helical groove $j$ terminating at each end in a circular groove $j'$, $j^2$. A steel ball $k$ or other suitable projection is fixedly mounted within the bearing to engage the helical and circular guide grooves $j$, $j'$, $j^2$ referred to.

When the worm spindle $i$ is at one or other extremity of its axial movement the steel ball $k$ or other projection engages one of the circular grooves $j'$ or $j^2$ and so the spindle $i$ can be rotated freely. When the spindle $i$ is to be moved axially so as to bring about the closing or opening of the valve $d$ an initial thrust in the appropriate direction is imparted to the spindle whilst rotating the same. This initial thrust may be manually imparted to the spindle when the handle thereof is grasped by the operator to effect a rotation thereof. The helical groove $j$ is thereupon caused to engage the fixed projection $k$ so that by continued turning the spindle $i$ is moved longitudinally by screw action, the fixed projection $k$ engaging, after the valve has been completely opened or closed, the other circular groove $j'$ or $j^2$. The opening and closing of valve $d$ is thus controlled by the longitudinal movement of spindle $i$. When this spindle has reached its limit of longitudinal travel in one direction, and has opened valve $d$, further rotary movement of spindle $i$ with worm $h$ causes rotation of worm gear $g$ and with it, the blower tube $a$. The limits of oscillatory travel of blower tube $a$ are controlled by the stops $m$ and $n$. $m$ is a curved member attached to, or formed integral with worm gear $g$, with which it rotates. $n$ is a projection of the fixed bearing bracket $i^3$ and is adapted to contact with the opposite ends of stop $m$ to determine the limits of oscillatory travel of blower tube $a$.

The worm gear $g$ may be held to its shaft by a collar $q$ and nut $o$, the latter threadedly engaging the end $r$ of the shaft. The shaft at $s$ is of larger diameter than at $r$, thus affording a shoulder against which the worm gear $g$ bears and against which it is held by the nut $o$. The disc $p$ is attached to nut $o$ and turns with it. This disk serves to protect the worm gear $g$ and is also of assistance in tightening up nut $o$.

If desired the helical groove $j$ in the worm spindle may be made sufficiently steep in pitch to allow automatic closing of the valve $d$ upon the handle being released by the operator.

As shown the worm spindle $i$ is provided with a bifurcated lug $l$ for the attachment of the operating handle which is not shown.

As will be understood the natural resistance to rotation of the jet tube will, when the worm spindle is rotated, create an axial thrust in said spindle serving to open the valve independently of the assistance of the helical groove and fixed projection, except in apparatus where the resistance to rotation is low and the steam pressure high.

The apparatus has been described as a boiler cleaner but is, obviously, fully applicable to cleaning the heat transfer surfaces of fluid heater cleaners similar to boilers. It is, therefore, to be understood that the term "boiler cleaner" includes cleaners for apparatus similar to boilers, such as fluid heaters.

I claim:

1. In a soot blower, the combination of a cleaning fluid casing provided with a valve for controlling the passage of cleaning fluid therethrough, a blower tube communicating with said casing to receive cleaning fluid therefrom and having one end turnably mounted with respect to said casing, said tube being provided with a nozzle for discharging a jet of cleaning fluid adjacent parts of a boiler to be cleaned, and manually operable means for operating said valve and said tube including a rotatable and axially movable spirally grooved element adapted to be manually rotated, and a member engageable in said groove for producing axial movement of said element, said means also including a pair of inter-engaged gears, one of which is rotatable with the blower pipe, said means being arranged so as to first open said valve and then turn said tube in one direction when operated in one direction and to return said tube to its normal position and then permit closing of said valve when operated in the other direction.

2. In a soot blower, the combination of a cleaning fluid casing provided with a valve for controlling the passage of cleaning fluid therethrough, a blower tube communicating with said casing to receive cleaning fluid therefrom and having one end turnably mounted with respect to said casing, said tube being provided with a nozzle for discharging a jet of cleaning fluid adjacent parts of a boiler to be cleaned, and manually operable means for operating said valve and said tube including a rotatable and axially movable spirally grooved element adapted to be manually rotated, and a member engageable in said groove for producing axial movement of said element, said means also including a pair of inter-engaged gears, one of which is rotatable with the blower pipe, said means being arranged to operate the valve in advance of the blower pipe.

3. In a soot blower the combination of a cleaning fluid casing provided with a valve for controlling the passage of cleaning fluid therethrough, a blower tube communicating with said casing to receive cleaning fluid therefrom and having one end turnably mounted with respect to said casing, said tube being provided with a nozzle for discharging a jet of cleaning fluid adjacent parts of a boiler to be cleaned, a worm wheel secured to said end of said tube, a rotatable and axially movable spirally grooved element having a worm thereon engaging said worm-wheel for imparting rotation to the tube, said element being positioned to actuate the valve upon axial movement of the element, and a member engageable in said groove for producing axial movement of said element to cause the said element to actuate the valve, said parts being arranged for manual operation to unseat the said valve in advance of rotating the blower pipe.

4. In a soot blower, the combination of a cleaning fluid casing provided with a valve for controlling the passage of cleaning fluid therethrough, a blower tube communicating with said casing to receive cleaning fluid therefrom and having one end turnably mounted with respect to said casing, said tube being provided with a nozzle for discharging a jet of cleaning fluid adjacent parts of a boiler to be cleaned, a manually rotatable and axially movable shaft extending transversely of the axis of the blower pipe and having a geared connection with said pipe for rotating the same, said shaft having a spirally grooved portion, and an element fixed with respect to the axial travel of said shaft and engageable in said grooved portion for causing axial movement of the shaft, said shaft being connected to operate said valve.

5. In a boiler cleaner, the combination with a blower pipe, of a valve for controlling the passage of cleaning fluid to the blower pipe, a rotatable and axially movable element adapted to be manually actuated, means selectively operable to cause axial movement of said element and means cooperating with said element and with the valve for moving the latter from the former when the element is actuated in one of the aforesaid movements, and means cooperating with the said element and with the blower pipe for moving the latter from the former when the element is actuated in the other of the aforesaid movements.

6. In a soot blower, the combination with a cleaning fluid casing provided with a valve for controlling the passage of cleaning fluid therethrough, the said valve being adapted to be normally closed by the pressure of the cleaning fluid, of a blower tube communicating with said casing to receive cleaning fluid therefrom, the said blower tube having one end rotatably mounted with respect to said casing and being provided with a nozzle for discharging a jet of cleaning fluid adjacent parts of a boiler to be cleaned, manually operable means for operating said valve and said tube, said means including a rotatable and axially movable spirally grooved element adapted to be manually rotated, a member engageable in said groove for producing axial movement of said element, and a pair of inter-engaging gears, one of which is rotatable with the blower pipe, said means being arranged so as to first impart a thrust to said valve to open the same and then turn said tube in one direction when operated in one direction and to return said tube to its normal position and then to relieve the thrust on the said valve when operated in the other direction.

7. The combination with a rotatable blower element and a valve for controlling the supply of cleaning fluid to said element, of inter-engaging members operable to impart a rotative movement to said element, one of said members being mounted for longitudinal movement and positioned to actuate the valve, and means for selectively effecting a longitudinal movement of said longitudinally movable member to actuate said valve while maintaining the engagement of said members with each other.

8. The combination with a rotatable blower element and a valve for controlling the supply of cleaning fluid to said element, of inter-engaging members operable to impart a rotative movement to said element, one of said members being mounted for longitudinal movement and positioned to actuate the valve, and means selectively engageable with said longitudinally movable member for imparting a longitudinal movement to the same to actuate the said valve while maintaining the engagement of said members with each other.

9. The combination with a rotatable blower element and a valve for controlling the supply of cleaning fluid to said element, of a worm and worm gear for rotating the said element, said worm being mounted for longitudinal movement and positioned to actuate said valve and means selectively operable to impart a longitudinal movement to said worm to actuate the said valve.

10. The combination with a rotatable blower element and a valve for controlling the supply of cleaning fluid to said element, of means for rotating said element, said means including a worm gear, a worm, and a longitudinally movable spindle for actuating the said worm, the said spindle being provided with a spiral groove and positioned to actuate said valve, and means selectively engageable with the spiral groove on the said spindle for effecting a longitudinal movement of the said spindle to actuate the said valve.

11. The combination with a rotatable blower element and a valve for controlling the supply of cleaning fluid to said element, of means including a rotatable member for imparting a rotative movement to said element, said member being mounted for longitudinal movement and positioned to actuate said valve and means selectively operable to compel longitudinal travel of said member upon rotation of the same to actuate the said valve.

12. The combination with a movable blower element and a valve for controlling the supply of cleaning fluid to said element, of means including a movable member for imparting movement to said element, said member being mounted for a second type of movement and being positioned to actuate said valve, and means selectively operable to compel movement of said member conformable to said second type to actuate the said valve.

13. The combination with a rotatable blower element and a valve for controlling the supply of cleaning fluid to said element, of means including a rotatable member for imparting a rotative movement to said element, said member being mounted for a second type of movement and being positioned to actuate said valve, and means selectively operable to compel movement of said member conformable to the said second type to actuate the said valve upon rotation of the said member.

14. In a boiler cleaner, the combination with an oscillatable blower element and a valve for controlling the supply of cleaning fluid to said element, of means including a movable member for imparting oscillation to said element, said member being mounted for a second type of movement and being positioned to actuate said valve by said second type of movement and means selectively operable to restrain movement of said member conformable to said second type to provide for the imparting of a plurality of cycles of oscillatory movement to said blower element while maintaining said valve in open position.

15. In a boiler cleaner, the combination with a blower element mounted for oscillation, and a valve for controlling the supply of cleaning fluid to said blower element, of a member mounted for rotative movement and arranged to impart oscillatory movement to said blower element by said rotative movement, said member being mounted for a second type of movement and being positioned to actuate said valve by said second type of movement, and means operable to restrain movement of said member conformable to the second type to provide for the imparting of a plurality of oscillatory movements to said blower element while holding said valve in open position.

PERCY GILBERT HANDOLL.